Jan. 8, 1929. 1,698,407
O. JOHNSON
SOUND REPRODUCER
Filed Oct. 2, 1924
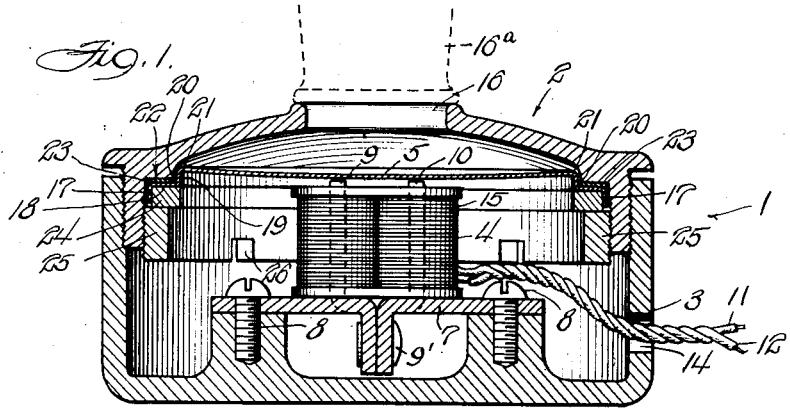
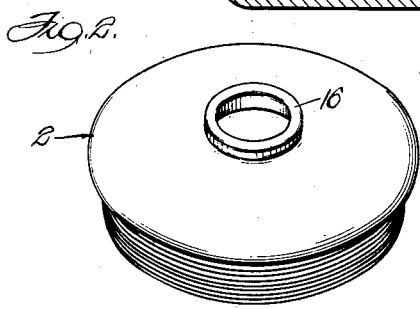
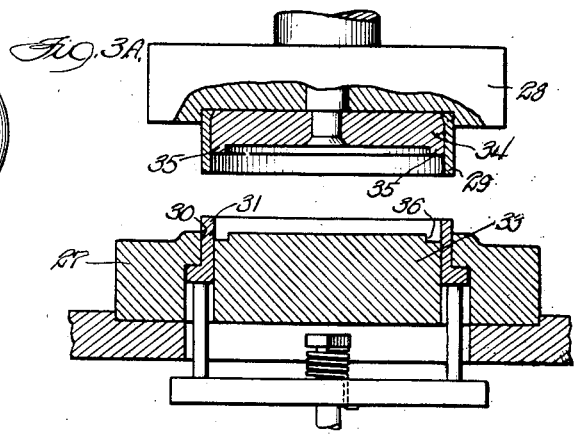
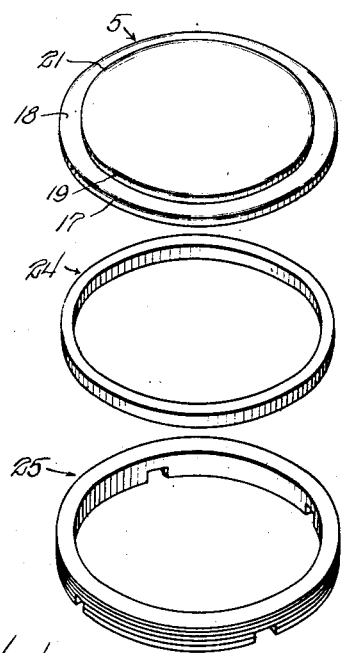
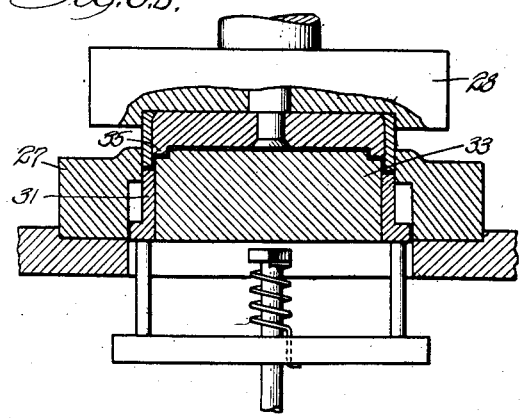

Patented Jan. 8, 1929.

1,698,407

UNITED STATES PATENT OFFICE.

OTTO JOHNSON, OF BROOKFIELD, ILLINOIS, ASSIGNOR TO BERTRAM GRIGSBY AND WILLIAM C. GRUNOW, BOTH OF CHICAGO, ILLINOIS.

SOUND REPRODUCER.

Application filed October 2, 1924. Serial No. 741,275.

My invention relates to the art of reproducing articulate speech and more particularly to an improved reproducer or "loud speaker" especially adapted for radio reception, although the invention is applicable to other types of electrically transmitted sound receiving apparatus, such as telephones, or the like.

Heretofore, it has been customary to believe that the permanent magnet reproducer is an improvement over the electromagnetic instrument. However, the uncertain properties and life of permanent magnets used in "loud speakers" are well known. In the permanent magnet type, the magnitude of attraction or repulsion between the core and the diaphragm depends not only on the strength of the varying current, but also on the strength of the permanent magnet. It is the general belief that the stronger this permanent magnet is the better. However, the force of attraction between the diaphragm and the poles varies as the square of the magnetic force between them. From this consideration alone, it would appear that by indefinitely increasing the strength of the permanent magnet, the force of attraction and repulsion, and therefore, the amount of motion of the diaphragm and the loudness of the sound, could be indefinitely increased. But, inasmuch as the diaphragm is capable of magnetic saturation, there will be a loss instead of a gain by increasing the strength of the permanent magnet, because when the number of lines of force is very large, causing either the core or the diaphragm or both to be magnetically saturated, a variation of the current in the coil will alter the number of lines of force through the magnetic circuit by an imperceptible amount. Thus, it is apparent that the force exerted between the diaphragm and the core will change by an imperceptible amount.

To remedy this difficulty, thicker diaphragms have been suggested, but it is apparent that this impairs flexibility and instantaneous response of the diaphragms.

On the other hand, if no permanent magnets were used, it has been the belief that an inferior instrument would result, on the grounds that it would be indistinct, due to rattling of the diaphragm, because the constant tension on the diaphragm produced by a permanent magnet would be absent. This constant tension proved valuable to eliminate after tones in the magneto or permanent magnet type. The diaphragm would not tend to take up a period of vibration of its own, and depend on its natural rate of damping to come to rest after its forced vibrations produced by the variable currents in a reproducer have stopped. The permanent magnet itself served as a stop, because if the diaphragm did not immediately come to rest, it would be generating by its own motion either currents in the coil or eddy currents in the magnet and diaphragm, which currents would be flowing in such a direction as to oppose the motion producing them, and these currents would require the expenditure of energy to generate them; but as there is no external source of energy provided to keep the diaphragm vibrating, the latter had to come to rest instantly.

From this it is clear why the permanent magnet type of reproducer has been considered superior. This was true notwithstanding the difficulties encountered, as above pointed out, in preventing saturation of the diaphragm or core by strengthening the permanent magnet to the required point. Either the flexibility of the diaphragm had to be sacrificed by an increased thickness, or the force between the diaphragm and core produced by a variable current in the coil weakened appreciably.

An object of my invention is to provide an improved form of reproducer of the electromagnet type having a diaphragm under constant inherent tension for accomplishing the same advantage of the magneto type, viz, preventing after tones or a tendency of the diaphragm to take up a period of vibration of its own after the forced vibration produced by the variable currents in the circuit have stopped.

A further object of my invention is to accomplish this aforesaid damping effect of the permanent magnets after forced vibrations of the diaphragm produced by the variable currents have stopped, by the provision of an improved form of diaphragm being preferably in the shape of a "bow" extending toward the poles of the electromagnets. That is to say, I prefer placing the diaphragm under an inherent tension which permits retention of its inherent resiliency and yet controls its vibrating movement whereby upon discontinuance of the forced vibrations, the tension of the diaphragm will return and hold the diaphragm in normal position.

By eliminating the permanent magnet, I also eliminate the interference between its lines of force and the fluctuations caused by current changes in the coil. Furthermore, the arrangement is such that a minimum of current may be used, and the volume may be obtained by adjustment of the air gap between the poles and diaphragm, rather than by increased current, which results in distortion of sound.

Moreover, aside from the actual sound reproducing efficiency, I have provided a reproduced or "loud speaker" approaching closely to mechanical perfection. The device is durable and is of such construction that its adjustment will not be changed by mechanical shocks or by changes in climatic temperature.

A further object of my invention resides in the provision of a novel support for the periphery of the diaphragm whereby the proper adjustment may be quickly and easily made to place the bowed portion of the diaphragm under a slightly changed tension to vary the loudness of the tone.

A still further object is in the provision of durable and efficiently constructed housing providing the diaphragm chamber and supporting the electromagnets, which may be provided with simple means for varying the distance or gap between the poles and the diaphragm. By means of this arrangement it is likewise possible to vary the loudness of the tone.

These and other objects will appear from the following specification when taken in connection with the accompanying drawings which illustrate one of the possible embodiments of my invention.

In the drawings:

Figure 1 is a transverse vertical section of a device embodying my invention;

Fig. 2 is an exposed view of those parts carrying the diaphragm; and

Figs. 3A and 3B illustrate the manner of forming the diaphragm so that the central or vibrating portion thereof is biased or bowed.

The sound reproducer or receiver 1 comprises a cap 2, a cup 3, in which a pair of electromagnets 4 are carried, and a diaphragm 5 adapted to be seated in the cap 2.

The base of the cup 3 is provided with upstanding lugs spaced apart to receive brackets 7, suitably fastened thereto, by the screws 8. The inner ends of the brackets 7 are turned downwardly and arranged to abut each other and secured together by a rivet 9'. Poles 9 and 10 of the electromagnets 4 may be formed in any suitable manner, but I prefer turning the central portion of the horizontal legs of each bracket 7 upwardly, as illustrated in Figure 1, so that the electromagnets may be suitably received thereon and held in a compact relation within the cup 3. The leading-in wires 11 and 12 may enter the cup 3 by way of an aperture 14 furnished in the side of the cup. Electromagnets 4 may be of any standard construction, comprising the ordinary spools about which the winding 15 may be suitably wound.

The upper portion of cap 2 is preferably dome shape, and is furnished with a sound emitting opening 16, to which any suitable instrument or horn 16' may be secured for amplifying or sending forth the sound emitted by the diaphragm 5. Diaphragm 5 may be provided with a peripheral flange 17 which is turned at right angles or vertically to a flange 18. Flange 18 then unites with a second vertical flange 19 by means of a shoulder 20, and the second vertical flange 19 joins the vibrating portion of the diaphragm by means of a shoulder 21. The flange 18 is adapted to be received by a seat 22, between which a gasket 23, preferably of paper or material of like characteristics, may be interposed. On the opposite side of the flange 18 of diaphragm 5, a diaphragm supporting ring 24 is provided, which supporting ring is held in position by a diaphragm clamping ring 25. Ring 25 is preferably provided with external threads which are adapted to cooperate with internal threads on cap 2. This construction permits, by means of openings 26 and any suitable spanner wrench, relative adjustment between the ring 25 and cap 2, so that the diaphragm holding ring 22 may be brought tightly against the diaphragm flange 18.

I wish to point out that I have obtained excellent results when the diaphragm supporting ring or washer 24 is made of fibre, as it tends to eliminate a metallic sound which has been noticeable when this ring is made of metal. However, I intend employing metal, or other material, if I so desire.

By referring to Figures 3A and 3B, the manner in which the diaphragm 5 is formed, preferably by a stamping operation, is illustrated. A disk slightly larger than the desired diameter is first cut out of a stock strip. As illustrated in Figure 3A, the stock strip is placed upon the female member 27 of the die directly in the path of the male member 28. When male member 28 advances toward the female member 27, the punches 29 function to cut the stock strip at 30. Continued downward movement of the male member 28 results in the periphery or surplus material of the disk thus formed, by the cutting, being firmly gripped between the punches 29 and movable pins 31 on a spring mounted carriage 32. With this downward movement continuing, the metal is pulled between the punches 29 and a stationary block 33, as illustrated in Fig. 3ᴮ, and the vertical peripheral flange 17 of the diaphragm 5 is formed. During this operation, a block 34 advances toward the block 33, and the annular flange 35 provided thereon serves to engage in a corresponding groove 36 in the block 33 whereby the flanges 18 and 19 and the shoulders 20 and 21 may be formed. It will be noted that the forming of these flanges 18 and 19 and shoulders 20 and 21 will tend to stretch the metal outwardly from the center of the disk, because the outer periphery or surplus material between the punches 29 and pins 31 is firmly gripped. When the diaphragm is removed from the die, its central or vibrating portion will tend to assume a biased or bowed formation, due to the metal being stretched by the forming of the peripheral flanges 18 and 19 and shoulders 20 and 21. Stretching of the diaphragm places its central portion under an inherent tension. I have found that the members of the die when brought together in the stamping or forming operation do not of their own action function to stamp the central portion 28 of the blank 25 in a biased or bowed configuration, this being apparent from the fact that I have shown in Figures 3ᴬ and 3ᴮ the inner surface of the female member 26 as being flat, and the corresponding surface of the male member also as being flat.

In Figure 1, it will be noted that the diaphragm 5 is positioned in close proximity to the poles 9 and 10 of the electromagnets 4. The air gap between the poles and diaphragm may be quickly and easily varied by relative movement between the cup 1 and the cap 2. This movement, in the present instance, is accomplished by providing exterior threads on cap 2, which cooperate with interior threads on cup 1. I have found that relative movement of the diaphragm clamping ring 23 with respect to the cap 2 will decrease or increase the bias or bow of the diaphragm 5. This is advantageous in that it allows an exceedingly accurate adjustment to obtain any desired loudness of tone. However, it is intended to provide this adjustment during the initial assembly and rely upon the adjustment of the cap 2 relative to the cup 1 for variation in the loudness of the tone when the instrument is in use.

I prefer stamping out the disk 5 so that the entire vibrating portion of the diaphragm 5, which portion is defined by the annular shoulder 19, will be bowed, thereby allowing greater vibrating flexibility of the diaphragm. It will be noted that I prefer arranging the diaphragm so that the bias or bow of the diaphragm is in the direction of the poles 9 and 10 of the electromagnets 4. As soon as the varying current flows through the windings 15, in the electric circuits the resultant magnetic field at the poles causes the initial vibration of the diaphragm 5 to be in the direction of these poles. Consequently, the vibrating portion of the diaphragm is flexed against the inherent tension under which it is placed. Hence, the diaphragm may automatically flex back into its normal position. This action is continued until the varying currents in the circuit have stopped. The diaphragm will then go to rest immediately, this being effected by the fact that it is under its own tension, which is increased each time it vibrates, by vibrating in the direction of the poles of the magnets. I wish to point out that the bias or bow of the diaphragm is sufficient to prevent, during vibration, the convexing of the diaphragm in the opposite direction, that is, away from the poles 9 and 10, so that there is no possibility of the air gap between the poles and itself increasing.

I have found that with the diaphragm under a tension of bowed formation, practically no difficulty is experienced in reproducing the constantly varying rate and amplitude of vibration produced at the transmitting end of radio circuits, and furthermore, fundamental tones and all over-tones, or harmonics, may be reproduced, giving each its proper value and without altering the phase relations between them. While I have attributed the improved results obtained from the bowed diaphragm to the fact that the diaphragm is thereby placed under an inherent tension so that it will not take up a period of vibration of its own after the electric currents in the circuit have stopped, it is possible that this improved result obtained by this bowing of the diaphragm is caused by reasons unknown to me at the present time. In such an event, I do not desire to be limited by the aforesaid explanation.

The amplitude of the sound waves produced by the influence of the magnetic lines of force upon the bowed diaphragm may be changed by varying the distance between the electromagnet poles and the diaphragm. This results in the receiver emitting sounds that may be made loud or soft, that is, that may be varied at will. Adjustment of the bowed diaphragm relative to the poles of the electromagnets further tends to vary the quality of the tone. A pure tone, such as one produced by simple vibration, may be obtained by proper adjustment. Moreover, placing the diaphragm under an inherent tension will result in increased quality of tone, as the latter is generally dependent on the form of sound wave emitted.

While I do not intend making the various parts of the device disclosed herein of any particular material, it might be said that I have obtained good results by making the cup 1 and cap 2 of brass, the brackets 7 of metal of good magnetic quality; and being of the same material as the poles of the electromagnets, these brackets will have the same co-efficient of expansion as the poles, which is highly advantageous, and the disk 5 of tin plated iron of good magnetic quality. With a diameter of $2\frac{5}{16}$ inches, the diaphragm 5 has operated perfectly and given excellent results, but I do not, of course, desire to be limited to any particular dimension.

The gist of the present invention, as understood at the present time, resides in placing the diaphragm under an inherent tension.

It is believed that the principle underlying this invention, its functional law, and the merits and advantages which it possesses will be entirely clear to those skilled in the art without further detailed description of other equivalent specific forms in which the invention may obviously be embodied. Hence, without limiting the invention to the particular embodiment herein selected for purposes of illustration and description,

I claim:—

1. In a sound reproducer, the combination of a diaphragm having a normally bowed inner portion, a diaphragm receiving member having a seat for said diaphragm, and means adjustable relative to said diaphragm receiving member adapted to seat said diaphragm, the adjustable engagement of said diaphragm on said seat permitting a variation in the bow of said inner portion of said diaphragm.

2. In a sound reproducer, the combination of a diaphragm of normally bowed formation, a diaphragm receiving member having a seat for said diaphragm, and means adapted adjustably to seat said diaphragm, said means adjustably varying the bowed formation of the inner portion of said diaphragm.

3. In a sound reproducer, the combination of a diaphragm, electromagnets, a diaphragm receiving member having a seat for said diaphragm, and means for seating said diaphragm, said means biasing the inner portion of said diaphragm toward the poles of said electromagnets.

4. In a sound reproducer, the combination of a diaphragm having a vibrating portion of normally bowed formation, a seat for said diaphragm, and means for seating said diaphragm thereon whereby the bowing of the diaphragm may be varied by the adjustment of the diaphragm.

5. The method of forming a metallic diaphragm for use in a sound reproducing instrument comprising first cutting the blank to a size slightly larger than the diameter of the diaphragm, second, holding said blank about its periphery by gripping the surplus material, third, operating on the blank adjacent to the periphery to form a flange about the blank by stretching the inner portion of the blank and placing it under an inherent tension, and trimming the surplus material from the periphery of the blank.

6. The method of forming a metallic diaphragm for use in a sound reproducing instrument comprising, first, gripping a blank about its periphery, and then, forming a flange at said periphery whereby the inner portion of the blank will be placed under an inherent tension resulting from the stretching thereof.

7. In a sound reproducer, the combination of a diaphragm, means for seating said diaphragm, a bracket, electromagnets supported on said bracket, said means having relative movement for varying the seating engagement of said diaphragm whereby the inner portion of the diaphragm may be biased toward the poles of said electromagnets for varying the loudness of the sound reproduced.

8. In a sound reproducer, the combination of a diaphragm having normally an inherently tensioned inner portion, means for seating said diaphragm, a bracket, electromagnets supported on said bracket, said means having relative movement for varying the seating engagement of said diaphragm whereby the tension of said inner portion of the diaphragm may be varied for varying the loudness of the sound reproduced, and means for varying the air gap between said tensioned portion of said diaphragm and said poles of the electromagnets.

9. In a sound reproducer, a cup-like member, a cap adjustably supported thereon, said cap having a seat therein, a diaphragm for said seat, means for adjustably seating said diaphragm on said seat, a bracket in said cup-like member, electromagnets supported on said bracket, said adjustable seating means permitting the vibrating portion of said diaphragm to bias so as to vary its position with respect to said electromagnet.

10. In a sound reproducer, the combination of a diaphragm, a seat provided with means for adjustably seating said diaphragm, a bracket, and electromagnets supported on said bracket, said means biasing the vibrating portion of said diaphragm so as to vary its position with respect to said electromagnets, the adjustability of said means permittitng the bias to vary according to the desired loudness of the sound reproduced.

11. In a sound reproducer, the combination of a diaphragm normally under an inherent tension, a seat for said diaphragm, a retaining ring for seating said diaphragm, and a clamping ring for positioning said retaining ring, the tension of said diaphragm adapted to be varied by the engagement between said retaining ring and the diaphragm.

12. In a sound reproducer, the combination of a diaphragm, a chamber in which said diaphragm is seated, electromagnets, and a bracket for supporting said electromagnets, said bracket having upwardly turned portions serving as the cores of said electromagnets.

13. Telephonic apparatus comprising a diaphragm having its vibrating portion circumscribed by a series of stepped peripheral flanges.

In witness whereof, I have hereunto subscribed my name.

OTTO JOHNSON.